United States Patent
Dyks et al.

(10) Patent No.: US 9,011,954 B2
(45) Date of Patent: *Apr. 21, 2015

(54) PROCESS FOR THE MANUFACTURING OF FROZEN AERATED PRODUCTS

(75) Inventors: Stephen John Dyks, Bedford (GB); Vito Antonio Tricarico, Jr., Naples (IT); Paul Edward Cheney, Bedford (GB); Ian William Burns, Bedford (GB); Leonie Martine Warmerdam, Vlaardingen (NL); Jonkheer Theodoor Hendrik Poll van de, Vlaardingen (NL)

(73) Assignee: Conopco, Inc., Englewood Cliffs, NJ (US)

( * ) Notice: Subject to any disclaimer, the term of this patent is extended or adjusted under 35 U.S.C. 154(b) by 376 days.

This patent is subject to a terminal disclaimer.

(21) Appl. No.: 10/643,244

(22) Filed: Aug. 18, 2003

(65) Prior Publication Data

US 2004/0071834 A1    Apr. 15, 2004

(30) Foreign Application Priority Data

Aug. 20, 2002    (EP) ..................... 02255801

(51) Int. Cl.
  *A23G 3/34*    (2006.01)
  *A23G 3/02*    (2006.01)
  *A23G 9/20*    (2006.01)
  *A23G 9/28*    (2006.01)
  *B30B 11/16*   (2006.01)

(52) U.S. Cl.
  CPC ............ *B30B 11/16* (2013.01); *A23G 3/0236* (2013.01); *A23G 9/20* (2013.01); *A23G 9/28* (2013.01)

(58) Field of Classification Search
  USPC ................. 426/280, 565, 660, 385, 389, 512
  See application file for complete search history.

(56) References Cited

U.S. PATENT DOCUMENTS

| | | | |
|---|---|---|---|
| 2,705,462 A | 4/1955 | Reinhard |
| 3,899,273 A | 8/1975 | Green |
| 4,059,378 A | 11/1977 | Sollich |
| 4,262,029 A | 4/1981 | Kleiner et al. |
| 4,375,349 A | 3/1983 | Vrbanek |

(Continued)

FOREIGN PATENT DOCUMENTS

| | | |
|---|---|---|
| DE | 34 17 196 | 11/1985 |
| DE | 35 32 071 | 7/1986 |

(Continued)

OTHER PUBLICATIONS

Hui, Y.H. (ed) Dairy Science and Technology Handbook vols. 1-3, 1993 John Wiley and Sons. pp. 251 and 252.*

(Continued)

*Primary Examiner* — Kelly Bekker
(74) *Attorney, Agent, or Firm* — Gerard J. McGowan, Jr.

(57) ABSTRACT

Frozen aerated products are produced by i) providing two separate forming elements, ii) providing at least one open cavity on a surface each forming element, iii) providing filling devices for filling said cavities with a frozen aerated material, iv) filling two cavities, one on each moulding surface, with a frozen aerated material, wherein at least one of the cavities is filled with a frozen aerated product having an overrun of between 30% and 130%, this product is then allowed to expand outside its cavity, the two cavities are then moved opposite one another and the frozen aerated product in each cavity is pressed against the frozen aerated product in the other cavity.

15 Claims, 2 Drawing Sheets

(56) References Cited

U.S. PATENT DOCUMENTS

Figure 1:
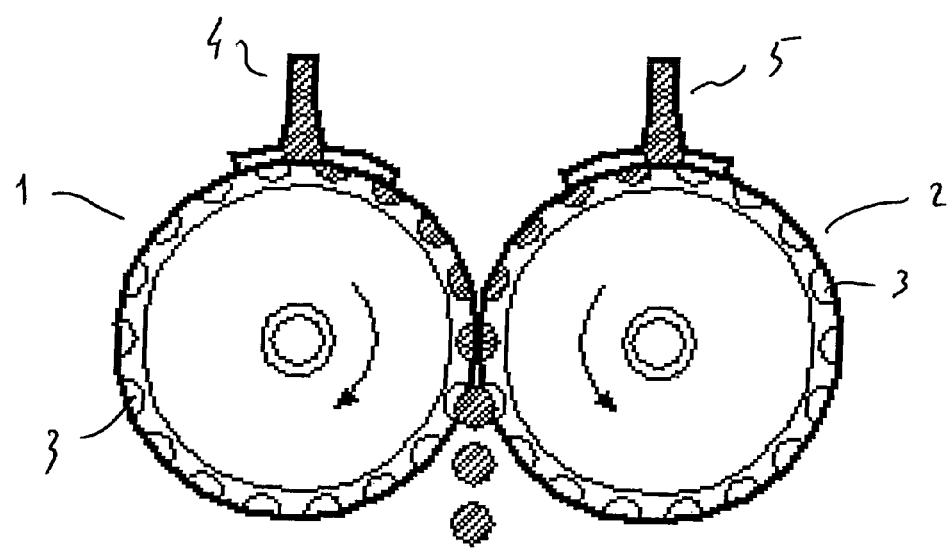

| | | |
|---|---|---|
| 4,612,852 A | 9/1986 | Price et al. |
| 4,652,456 A | 3/1987 | Sailsbury |
| 4,761,128 A * | 8/1988 | Fowler et al. ............... 425/126.2 |
| 4,828,854 A | 5/1989 | Beer |
| 5,158,785 A | 10/1992 | Konig |
| 5,358,727 A | 10/1994 | Yates et al. |
| 5,493,957 A | 2/1996 | Kennedy et al. |
| 5,667,824 A | 9/1997 | Ream et al. |
| 5,727,713 A | 3/1998 | Kateman et al. |
| 5,902,621 A | 5/1999 | Beckett et al. |
| 5,948,456 A | 9/1999 | Jones et al. |
| 6,025,003 A | 2/2000 | Jadraque et al. |
| 6,216,472 B1 | 4/2001 | Cathenaut et al. |
| 6,251,454 B1 | 6/2001 | Layfield |
| 6,270,826 B1 | 8/2001 | Kashulines, Jr. et al. |
| 6,326,046 B1 | 12/2001 | Tucker et al. |

FOREIGN PATENT DOCUMENTS

| | | | |
|---|---|---|---|
| EP | 0 343 138 | 11/1989 | |
| EP | 0 539 646 | 5/1993 | |
| EP | 0 713 650 A1 | 5/1996 | |
| EP | 864256 A2 * | 9/1998 | ............... A23G 9/08 |
| EP | 0 582 327 B1 | 9/1999 | |
| EP | 1000551 A2 | 5/2000 | |
| EP | 1 064 851 | 1/2001 | |
| EP | 0 923 875 | 12/2002 | |
| EP | 923875 B1 * | 12/2002 | ............... A23G 1/20 |
| EP | 1886580 A1 | 2/2008 | |
| GB | 2 378 152 | 2/2003 | |
| JP | 58043746 | 3/1983 | |
| JP | 62-87056 | 4/1987 | |
| JP | 62091148 A * | 4/1987 | ............... A23G 9/16 |
| WO | WO 90/06693 | 6/1990 | |
| WO | 93/00817 | 1/1993 | |
| WO | WO 94/10855 | 5/1994 | |
| WO | 94/19963 | 9/1994 | |
| WO | WO 94/19972 | 9/1994 | |
| WO | WO 98/26911 | 6/1998 | |
| WO | WO 98/38872 | 9/1998 | |
| WO | WO 99/65325 | 12/1999 | |
| WO | WO 2004/017748 A2 | 3/2004 | |

OTHER PUBLICATIONS

Answers, http://wiki.answers.com/Q/What_is_the_density_of_ice_cream, pp. 1-3. printed Aug. 21, 2011.*
Publication No. 01030541 A. Miura Feb. 1, 1989, Patent Abstracts of Japan, p. 1.
Abstract of JP2000279095, Oct. 10, 2000, pp. 1-2.
Abstract of JP 2000279096, Oct. 10, 2000, pp. 1-2.
Binley, Co-pending U.S. Appl. No. 12/997,883, filed Dec. 14, 2010, pp. 1-10.
European Search Report on Application No. EP 02 25 5801 dated Jan. 8, 2003, pp. 1-3.
International Search Report on Int'l Application No. PCT/EP 03/08581 dated Feb. 11, 2004, pp. 1-4.
Patent Abstract of Japan, vol. 011, No. 300 (C-449) (1987) & JP 62 091148 A, p. 1, Apr. 1987.
*Ice Cream*, Fourth Edition, W.S. Arbuckle—Chapman & Hall, pp. 297-312, 1996.
Patent Abstract of Japan, vol. 003, No. 014 (C-036) & JP 53 140282 A, p. 1, Jul. 1978.

\* cited by examiner

PROCESS FOR THE MANUFACTURING OF FROZEN AERATED PRODUCTS

FIELD OF THE INVENTION

The present invention relates to a process for the manufacturing of frozen aerated products. The present invention more particularly relates to the manufacturing of shaped products such as ice cream balls and the like.

BACKGROUND OF THE INVENTION

Manufacturing chocolate balls has been known for decades and various technologies based on cylindrical rollers have been proposed such as the one described in EP923875 which describes a pair of parallel rollers having cavities defined on the outer cylindrical surfaces, a depositing device depositing a solidifiable liquid such as chocolate onto said cylindrical surfaces, thus providing two separate parts of food articles. By counter rotating the rollers, the two surfaces move towards one another and join the two separate parts into one food product. The whole process is based on the fact each individual food article is linked to the others by a film, or a web, made out of the same food material. It is also relying on the fact that, on cooling, chocolate contracts and readily de-moulds from the cavities.

Whereas this process is adequate for manufacturing chocolate balls from a liquid base, it is totally inappropriate for the manufacturing of ice cream products wherein the cavities would be filled by a frozen aerated product. The main obstacles against transferring this technology to ice cream products are that the cavities must be at a low enough temperature, otherwise the ice cream fed into these cavities will melt (at least at the surface), but if the cavities are below 0° C., at a temperature where ice starts to form, then the ice cream will stick to the surface and will not be easily 'de-mouldable'.

Such problems are for example illustrated in JP62-91148 which attempts to propose a process for the manufacturing of ice balls while addressing the problem of ice sticking to the walls of the cavities and which can be described as follows. When the corresponding cavities of the pair of rollers pass the point where they are the closest to one another, the frozen product in each cavity is not pressed hard enough against the contiguous product situated into the corresponding cavity on the other roller, when the cavities move again away from each other through the rotation of the rollers, the force linking the two half products is too weak in comparison with the adhesion between each half product and the cavity in which it is and thus it stays in the cavity and does not 'de-mould'. JP62-91148 addresses this problem by i) heating one of the roller with an internal circulation of hot liquid, ii) by providing ejection mechanisms in each cavity of the other roller, and iii) providing excess material proud of the roller surface. These ejection mechanisms allow for the two half products to be pressed together while heating one roller allows for demoulding the product.

This technology does not constitute a practical solution for the problem raised by attempting to produce frozen aerated products using a pair rollers since the need to effectively melt the surface of each product to allow for its de-moulding raises unacceptable hygiene issues. In other respect, the ejection mechanisms situated in each and every cavity of a roller are extremely complex, difficult to maintain, and again constitute a hygiene hazard.

It has now been found that, by taking benefit from the characteristics of some ice cream products which, at first sight, seem to constitute other impediments against the use of the roller technology to mould ice cream products, it is possible to produce ice cream balls in a simple, hygienic and efficient way.

Tests and Definitions

Frozen aerated product shall mean a frozen confection as described in ICE CREAM—Fourth Edition—W S Arbuckle—Chapman & Hall—pages 297 to 312.
Temperature of the rollers:
 The roller temperature is measured by a resistance temperature probe situated 5 mm beneath the surface.

BRIEF DESCRIPTION OF THE INVENTION

It is the object of the present invention to provide a process for the manufacturing of frozen aerated products comprising;
 providing two separate forming elements,
 providing at least one open cavity on a surface of each forming element,
 providing filling devices for filling said cavities with a frozen aerated material,
 filling two cavities, one on each forming element, with a frozen aerated material,
 wherein:
  a. at least one of the cavities is filled with a frozen aerated product having an overrun of between 30% and 130%,
  b. this product is then allowed to expand outside its cavity,
  c. the two cavities are then moved opposite one another and the frozen aerated product in each cavity is pressed against the frozen aerated product in the other cavity.

Preferably, the frozen aerated product in step a. has an overrun of above 45%, more preferably above 60% since it has been found that frozen aerated products with an overrun of 30% can lead to insufficient expansion in step b., thus leading to insufficient adhesion of the two halves following step c.

Preferably the temperature of the forming elements are cooled with liquid nitrogen and are at a temperature below −80° C., more preferably below −100° C.

Preferably, the frozen aerated product is at a temperature of between −3° C. and −20° C., preferably between −5° C. and 15° C., even more preferably between −7° C. and −11° C. when filled into the cavities.

More preferably, the two separate forming elements are a pair of parallel rollers wherein each roller has a multiplicity of open cavities on its surface, the rollers counter-rotating so that respective cavities in the two forming elements lie opposite one another and the frozen aerated product in a cavity of a first roller is pressed against the frozen aerated product in an opposite cavity of a second roller.

Whereas the two rollers can operate at a constant rotational speed, it has been found surprisingly advantageous to operate at variable rotational speed. It has particularly been noticed that the filling of the cavities is greatly improved if a roller stops, or at least significantly slows down, while a cavity is filled in. Therefore, the two rollers operate at a variable rotational speed. Preferably the rotational speed of a roller is at its minimal value when a filling device is over a cavity of this roller and at a maximal value when a filling device is between two cavities. More preferably, a roller is brought to stop when a filling device is over a cavity.

Preferably also, the rotational speed of both rollers is at a minimal value when two filled cavities face each other. In a most preferred embodiment, a minimal rotational speed of both rollers is reached when, at the same time, two filled cavities face each other and each filling device is over a cavity of each roller.

DETAILED DESCRIPTION OF THE INVENTION

The present invention will be further described with reference to the sole accompanying drawings wherein FIG. 1 represents a schematic view of an apparatus for carrying out the process according to the present invention.

Figure 2:
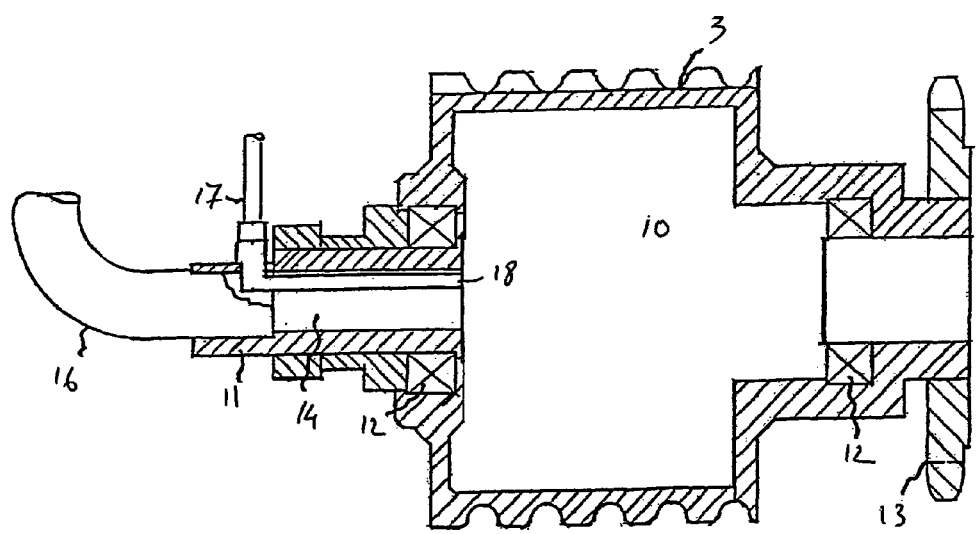

FIG. 2 represent a longitudinal cross section of a roller together with its cooling circuit for carrying out the process according to the invention.

As disclosed in the accompanying drawing, the apparatus comprises a pair of parallel rollers 1 and 2 having mould cavities 3 defined on their outer cylindrical surfaces. A first filling device 4 is provided for supplying frozen aerated product into the mould cavities 3 of the first roller 1. A second filling device 5 is provided for supplying frozen aerated product into the mould cavities 3 of the second roller 2. As disclosed in FIG. 1, the first and second filling devices may be independent from one another, alternatively, there may be one single filling device with two outputs, one for each roller. Motor means, not shown, are arranged for counter rotating the two rollers, to move the two surfaces towards one another and to press the frozen aerated product in a cavity of the first roller against the frozen aerated product situated in a cavity of the second roller.

Expansion of the frozen aerated product in the filled cavities is uninhibited after the filling devices to where the expanded frozen aerated product in each cavity is pressed against the expanded frozen aerated product in the other cavity.

The two rollers which are adapted to counter-rotate, are positioned to touch each other. By 'touching each other', it is meant a clearance of less than 0.1 mm. The rollers must be refrigerated by circulating an appropriate refrigerating fluid, such as liquid nitrogen, in order to have, in operation, a temperature of below −100° C., as measured by an internal probe 5 mm beneath the surface.

As shown in FIG. 2, a roller has a cylindrical cavity 10 and is rotatably mounted on a fixed shaft 11 by means of bearings 12. On the roll there is fixedly mounted a sprocket 13 by means of which the roll is rotated. From one end of the shaft extends an axial pipe 14 through the shaft 11, opening in cavity 10. A pipe 16 is connected to the open end of pipe 14 opposite cavity 10. A separate pipe 17 extends through pipe 14. Pipe 17 is terminated in cavity 10 with a nozzle 18.

During operation a refrigerating medium, preferably liquid nitrogen, is supplied through the pipe 17 and sprayed through nozzle 18 in cavity 10 where it will thus cool the outer wall of the cavity and thence cool the mould cavities 3. The refrigerating medium is then gasified and led through pipe 14 out through pipe 16.

Each of the two filling devices advantageously comprises a manifold mounted in the close proximity to the roller cylindrical surface, with a clearance, in operation of below 1 mm.

The two rollers can be made for example of aluminium or steel and the surface can be treated with a coating to improve hardness (e.g. chromium coating) or to improve mould release (e.g. PTFE). The mould cavities shapes follow the normal rules for demouldability. Preferably, at the level of mould cavity opening, the mould cavity wall is not substantially vertical. It thus allows a better expansion of the frozen aerated product and a better demouldability.

EXAMPLES

During this trial, the unit was equipped with two stainless steel rollers. The rollers had 3 lanes of ball (28 mm diameter) cavities arranged in a line across the width of the roller (96 balls per roller), each filling device being located at a 45° angle before the nip (point of contact of the two rollers).

Liquid nitrogen was fed to the rollers. The initial temperature of the rollers during the trials was −140° C.

Three different runs took place to determine the effect that the rotational speed of the roller has on product quality and release characteristics.

Examples A

Roller Speed=1 rpm=96 products per min
Rollers temperature actual range −139° C. to −151° C.
Rollers Motion:
Acceleration time=395 ms,
Deceleration time=395 ms,
Pause Time=1085 ms.
Frozen aerated product—Standard aerated ice cream mix.
Flow rate=50 kg/hr
Overrun=60%.
Extrusion Temperature=−7.9° C.
Samples for Quality Analysis were collected about 20 minutes after start up. Visual examination showed the products to be of good quality.
A large hard shell was seen on all products.
Over a 5 minute period, 8 halves (4 balls) were recorded, meaning a 0.8% defect rate.

Example B

Roller Speed=1.25 rpm=120 products per min
Roller temperature actual range −138 to −140° C.
Roller Motion:
Acceleration time=415 ms,
Deceleration time=415 ms,
Pause Time=665 ms.
Frozen aerated product—Standard aerated ice cream mix.
Flow rate=59 kg/hr
Overrun=60%.
Extrusion Temperature=−7.9° C.
Samples for Quality Analysis were collected about 10 minutes after stable conditions were obtained. Visual examination showed the products to be of good. The product quality appeared to be similar to those produced in Example A.
The thickness of the shell was reduced compared to the products in Example A.
Over a 5 minute period, 4 halves (2 balls) were recorded=0.3% defect rate.

Example C

Roller Speed=1.8 rpm=174 products per min
Roller temperature_actual range −130 to −138 C
Roller motion
Acceleration time=435 ms,
Deceleration time=435 ms,
Pause Time=65 ms.
Frozen aerated product—Standard aerated ice cream mix.
Flow rate=93 kg/hr
Overrun=60%.

Extrusion Temperature=−7.9° C.

Samples for Quality Analysis were collected about 10 minutes after stable conditions were obtained. Visual examination showed the products to be of good quality. The product quality appeared to be similar to those produced in Run (A) and (B).

The thickness of the shell was reduced compared to the products in Examples A and B. The thickness of the shell is governed by the residence time of the product in a cavity. The longer the residence time, the thicker the shell. It increases the mechanical resistance of each half product but decreases the area available for the adhesion of the two halves. The optimum residence time is function of the formulation of the product and the shape and volume of each cavity and can be determined experimentally.

Over a 5 minute period, 2 halves (1 balls) were recorded=0.1% defect rate.

To summarise, good quality products were produced over the range of 96-174 products per min using the stainless steel rollers. Low numbers of halves (0.1%-0.8% defect rate) were produced throughout the trial. The temperature of the rollers becomes easier to control at higher rotational speeds.

The invention claimed is:

1. Process for the manufacturing of frozen aerated products comprising:
   providing two separate forming elements which are a pair of parallel rollers each having internally a roller cavity,
   providing at least one open mould cavity on a surface of each forming element,
   providing filling devices for filling said mould cavities with a frozen aerated material, and
   a. cooling said surface of each forming element to a temperature below −80° C. by introducing a refrigerating medium into the roller cavity,
   b. filling two open mould cavities one on each forming element with a frozen aerated product having an overrun of between 30% and 130%,
   c. then allowing each product to expand outside its open cavity,
   d. then moving the two open mould cavities opposite one another so that the expanded frozen aerated product in each cavity is pressed against the expanded frozen aerated product in the other cavity, expansion of the frozen aerated product in said filled cavities being uninhibited after the filling devices to where the expanded frozen aerated product in each cavity is pressed against the expanded frozen aerated product in the other cavity.

2. Process according to claim 1 wherein each roller has a multiplicity of open mould cavities on its surface, the rollers counter-rotating so that respective mould cavities in the two forming elements lie opposite one another and the frozen aerated product in a mould cavity of a first roller is pressed against the frozen aerated product in an opposite mould cavity of a second roller.

3. Process according to claim 2 wherein the rollers counter rotate at a variable rational speed.

4. Process according to claim 1 wherein the rotational speed of a roller is at a minimal value when a filling device is over a mould cavity of this roller and at a maximal value when a filling device is between two mould cavities.

5. Process according to claim 1 wherein the roller is brought to stop when a filling device is over a mould cavity.

6. Process according to claim 1 wherein the rotational speed of each roller is at a minimal value when a filled mould cavity of one roller faces a filled mould cavity of the other roller.

7. Process according to claim 1 wherein both rollers are brought to stop when a filled mould cavity of one roller faces a filled mould cavity of the other roller.

8. Process according to claim 1 wherein a minimal rotational speed of both rollers is reached when at the same time, two filled mould cavities face each other and each filling device is over a mould cavity of each roller.

9. Process according to claim 5 wherein each roller is brought to a stop when, at the same time, two filled mould cavities face each other and each filling device is over a mould cavity of each roller.

10. Process for the manufacturing of frozen aerated products comprising;
    providing two separate forming elements which are a pair of parallel rollers each having internally a roller cavity,
    providing at least one open mould cavity on a surface of each forming element,
    providing a filling device for filling said mould cavities with a frozen aerated material,
    and
    a. cooling said surface of each forming element to a temperature below −80° C. by introducing a refrigerating medium into the roller cavity,
    b. filling two open mould cavities one in each forming element with a frozen aerated product having an overrun of between 30% and 130%, a first of said mould cavities being filled by a first filling device and a second mould cavity being filled by a second filling device, or said mould cavities being filled by a device with one output for each forming element,
    c. then allowing each product to expand outside its open mould cavity,
    d. then moving the two open mould cavities opposite one another so that the expanded frozen aerated product in each mould cavity is pressed against the expanded frozen aerated product in the other cavity, expansion of the frozen aerated product in said filled cavities being uninhibited after the filling devices to where the expanded frozen aerated product in each cavity is pressed against the expanded frozen aerated product in the other cavity.

11. The process according to claim 1 wherein the forming elements are at a temperature of below-100° C.

12. The process according to claim 1 wherein the forming elements are cooled with liquid nitrogen.

13. The process according to claim 1 wherein the frozen aerated product has an overrun of between above 45% and 130%.

14. The process according to claim 1 wherein the frozen aerated product comprises ice cream.

15. The process according to claim 10 wherein the frozen aerated product comprises ice cream.

* * * * *